(12) United States Patent
Roth

(10) Patent No.: US 12,240,053 B2
(45) Date of Patent: Mar. 4, 2025

(54) FRICTION WELDING OF CLADDED CEMENTED OR SINTERED CARBIDES TO A STRUCTURAL ELEMENT

(71) Applicant: SYNCRUDE CANADA LTD. in trust for the owners of the Syncrude Project as such owners exist now and in the future, Calgary (CA)

(72) Inventor: Hugh Roth, Edmonton (CA)

(73) Assignee: SYNCRUDE CANADA LTD., Calgary (CA), in trust for the owners of the Syncrude Project as such owners exist now and in the future ( * ) Notice: Subject to any disclaimer, the term of this patent is extended or adjusted under 35 U.S.C. 154(b) by 0 days.

(21) Appl. No.: 18/177,632

(22) Filed: Mar. 2, 2023

(65) Prior Publication Data
US 2023/0278133 A1  Sep. 7, 2023

Related U.S. Application Data

(60) Provisional application No. 63/317,125, filed on Mar. 7, 2022.

(51) Int. Cl.
| | |
|---|---|
| *B23K 20/00* | (2006.01) |
| *B23K 20/02* | (2006.01) |
| *B23K 20/12* | (2006.01) |
| *B23K 101/20* | (2006.01) |
| *B23K 103/00* | (2006.01) |
| *B23K 103/08* | (2006.01) |

(52) U.S. Cl.
CPC ............. *B23K 20/12* (2013.01); *B23K 20/02* (2013.01); *B23K 2101/20* (2018.08); *B23K 2103/08* (2018.08); *B23K 2103/52* (2018.08)

(58) Field of Classification Search
CPC .............. B23K 20/02; B23K 2101/20; B23K 2103/08; B23K 2103/52; B23K 1/0008; B23K 20/129; B23K 20/233; B23K 2103/04; B23K 2103/18; B23K 2103/26; B23K 20/16; B23K 20/227; B23K 20/12–1215; B23K 20/1285–1295
USPC ........ 228/112.1–114.5, 2.1–2.3, 122.1–124.7
See application file for complete search history.

(56) References Cited

U.S. PATENT DOCUMENTS

| | | | |
|---|---|---|---|
| 3,455,682 A | 7/1969 | Barbaras et al. | |
| 3,469,976 A | 9/1969 | Iler et al. | |
| 4,593,776 A | 6/1986 | Salesky et al. | |
| 4,907,665 A | 3/1990 | Kar et al. | |
| 5,054,682 A * | 10/1991 | Mistry | B23K 35/004 228/262.44 |
| 5,366,138 A | 11/1994 | Vela et al. | |
| 6,756,009 B2 | 6/2004 | Sim et al. | |
| 7,032,693 B2 | 4/2006 | Siracki | |
| 8,821,603 B2 | 9/2014 | Bitler et al. | |
| 2004/0048096 A1 * | 3/2004 | Doh | B23K 11/20 428/662 |
| 2010/0101866 A1 | 4/2010 | Bird | |
| 2013/0092608 A1 | 4/2013 | Tieu et al. | |
| 2013/0182982 A1 | 7/2013 | Dennis et al. | |
| 2013/0236240 A1 * | 9/2013 | Ishida | B23K 20/023 403/272 |
| 2014/0133996 A1 | 5/2014 | Roth et al. | |
| 2017/0203368 A1 | 7/2017 | Maderud et al. | |
| 2019/0160588 A1 * | 5/2019 | Roth | B23K 20/1205 |

FOREIGN PATENT DOCUMENTS

| | | | | |
|---|---|---|---|---|
| CA | 2254760 A1 | 6/1997 | | |
| CA | 2438637 A1 | 2/2004 | | |
| CA | 2709543 A1 | 2/2011 | | |
| CA | 3023421 A1 | 5/2019 | | |
| EP | 3564028 B1 * | 6/2021 | ............ | B23K 20/04 |
| EP | 4230336 A1 * | 8/2023 | ............... | B23K 1/00 |
| KR | 20030052618 A * | 6/2003 | | |
| KR | 20170105841 A * | 9/2017 | | |
| WO | 2016156203 A1 | 10/2016 | | |
| WO | WO-2018202339 A1 * | 11/2018 | ............... | B22F 5/00 |

OTHER PUBLICATIONS

Atkinson, Dr. H.V.; Davies, S. (Dec. 1, 2000). "Fundamental aspects of hot isostatic pressing: An overview". Metallurgical and Materials Transactions. A 2000, 31, 2981-3000.
Uday, M.B. et al., "Current Issues and Problems in the Joining of Ceramic to Metal", Joining Technologies. IntechOpen, 2016, Chapter 8, pp. 159-192.
Uday, M.B. et al., "Advances in Friction Welding Process: a Review", Science and Technology of Welding and Joining, 2010, vol. 15, No. 7, pp. 534-558, 2010.
Theisen, W., "HIP Cladding of Tools", Sixth International Tooling Conference, pp. 947-960, 2002.
Bonte, D. et al., "Friction Welding of Ceramics to Metal", Sustainable Construction and Design, vol. 1, No. 1, pp. 14-20, Feb. 10, 2010 (Feb. 10, 2010).
Examination Report issued in Canadian Application No. 3,191,610, dated Oct. 8, 2024.

* cited by examiner

*Primary Examiner* — Kiley S Stoner
(74) *Attorney, Agent, or Firm* — Knobbe, Martens, Olson & Bear, LLP

(57) ABSTRACT

A method for bonding a cemented (or sintered) carbide element to a structural component is provided comprising cladding at least one surface of the cemented (or sintered) carbide element with a metal alloy using diffusion bonding or brazing and friction welding a cladded surface of the cemented (or sintered) carbide element to the structural component.

14 Claims, 3 Drawing Sheets

FRICTION WELDING OF CLADDED CEMENTED OR SINTERED CARBIDES TO A STRUCTURAL ELEMENT

TECHNICAL FIELD

The present application relates generally to a method for friction welding a cladded cemented (or sintered) carbide element to a structural component for improved wear resistance of equipment or equipment parts that are typically used in the mining industry, for example, the oil sands mining industry.

BACKGROUND

Oil sands deposits are a loose (or unconsolidated) sand deposit which contains bitumen (a heavy, complex hydrocarbon or petroleum), fine clays and a small amount of water. The bitumen content of oil sands normally ranges from 8 to 12% but can be as high as 14%. Less than about 20% of Alberta's bitumen reserves are close enough to the surface to be mined. Mined oil sands deposits are normally less than 50 meters below the surface but can be as deep as 75 meters below grade. Anything deeper cannot be economically mined since too much waste material needs to be removed before the bitumen-rich oil sands can be accessed.

Surface mining is defined as the extraction of ore from an open pit or burrow. Surface mining is sometimes known as open-pit, open-cut or opencast mining and is only commercially viable if the deposit is located relative close to the surface. The deposit is excavated using large shovels, which dump the ore onto large haul trucks. The trucks then transport the oil sands to a slurry preparation plant. Oil sands mining fleets are subjected to some of the harshest conditions on earth. Equipment must be able to sustain brutally cold winters, abrasive silica sand, sticky bitumen and unstable ground conditions.

Once the mined oil sands is hauled to the slurry preparation plant, the large clumps of ore are broken down (e.g., by crushers) and then mixed with a large volume of hot/warm water, producing a pumpable slurry. The slurry must then be pumped for several kilometers to a bitumen separation plant. Once again, due to the abrasion/corrosive nature of oil sand slurries, equipment necessary to pump such a slurry, e.g., slurry pumps, pipelines, etc., must be able to withstand such harsh materials.

In some instances, it may be desirable to remove the larger aggregates present in oil sand slurry prior to pipelining in order to avoid blockage or damage of downstream equipment, e.g., pump component wear. Thus, vibrating screens may be used at various points during slurry preparation to reject larger lumps of oil sand, rocks and other aggregates, which are large enough to block or damage downstream equipment, prior to pipeline conditioning. Screens may also be used to further screen oil sand tailings slurry prior to treating/disposing same. However, once again, oil sand slurry is extremely heavy and abrasive due to the large amount of sand, gravel and crushed rock contained therein.

One recent development in improving wear of oil sands equipment involves the use of wear resistant tiles or inserts made from a hard material comprising cemented or sintered tungsten carbide. Cemented or sintered tungsten carbide is extremely wear resistant; however, its use has been somewhat limited by existing carbide attachment methods that are used to join sintered tungsten carbide to structural components, such as brazing, adhesives, and mechanical attachment.

One recent development described in Canadian Patent No. 3,023,421 suggests cladding at least one surface of a cemented or sintered tungsten carbide element (tile) with a metal layer using hot isostatic pressing (HIP) and then friction welding the cladded surface of the cemented or sintered tungsten carbide element to a structural component of interest. However, the use of HIP is very expensive and, therefore, there is a need in the industry, in particular, the oil sands mining industry, for a more cost effective way to join a sintered tungsten carbide element or tile to structural components.

SUMMARY

The current application is directed to a method for bonding wear resistant elements such as tiles or inserts comprising cemented or sintered tungsten carbide to a structural component, generally, a cast of carbon steel, stainless steel, or other strong steel, to improve wear resistance of the structure under harsh conditions.

Broadly stated, in one aspect, a method for bonding a cemented (or sintered) carbide element to a structural component is provided comprising:
cladding at least one surface of the cemented (or sintered) carbide element with a metal alloy using a diffusion bonding process or a brazing process; and
friction welding a cladded surface of the cemented (or sintered) carbide element to the structural component.

In one embodiment, the cemented (or sintered) carbide is comprised of tungsten carbide and a binder phase comprising cobalt, nickel, chromium, iron, molybdenum or combinations thereof. In another embodiment, the cemented (or sintered) carbide may contain varying proportions of tungsten carbide (WC), titanium carbide (TiC), tantalum carbide (TaC) or niobium carbide (NbC) and others. Cemented carbides, which have the cobalt binder phase alloyed with, or completely replaced by, other metals such as nickel, chromium, iron, molybdenum or alloys of these elements, may also be useful in the present method.

In one embodiment, the structural component is manufactured as a single unit that is cast or forged from carbon steel, low alloy steel, stainless steel, or other strong material (e.g. nickel or cobalt based alloys). In one embodiment, the cemented or sintered tungsten carbide elements are in the shape of tiles or inserts. In one embodiment, the cemented or sintered carbide elements are clad in a metal alloy such as nickel or cobalt alloys, although any material that does not degrade the cemented or sintered tungsten carbide can be used.

In one embodiment, the metal alloy is a nickel-cobalt ferrous alloy (often referred to a FerNiCo alloy) such as Kovar™. In one embodiment, the FerNiCo alloy is comprised of 29% nickel, 17% cobalt and the balance being iron.

In one embodiment, the diffusion bonding process uses an interface layer between the cemented (or sintered) carbide and the metal alloy such as Kovar™. In one embodiment, the interface layer comprises copper, nickel, silver or a nickel and copper alloy. It should be noted that Kovar™ is typically produced to specification ASTM F-15.

In one embodiment, brazing is used to clad the at least one surface of the cemented or sintered carbide element with the metal alloy such as Kovar™ using an interface layer comprising an alloy comprising copper and nickel, such as AMS4764, a 52.5Cu 38Mn 9.5Ni braze alloy.

Additional aspects and advantages will be apparent in view of the description, which follows. It should be understood, however, that the detailed description and the specific examples, while indicating preferred embodiments, are given by way of illustration only, since various changes and modifications will become apparent to those skilled in the art from this detailed description.

DETAILED DESCRIPTION

Figure 1A:
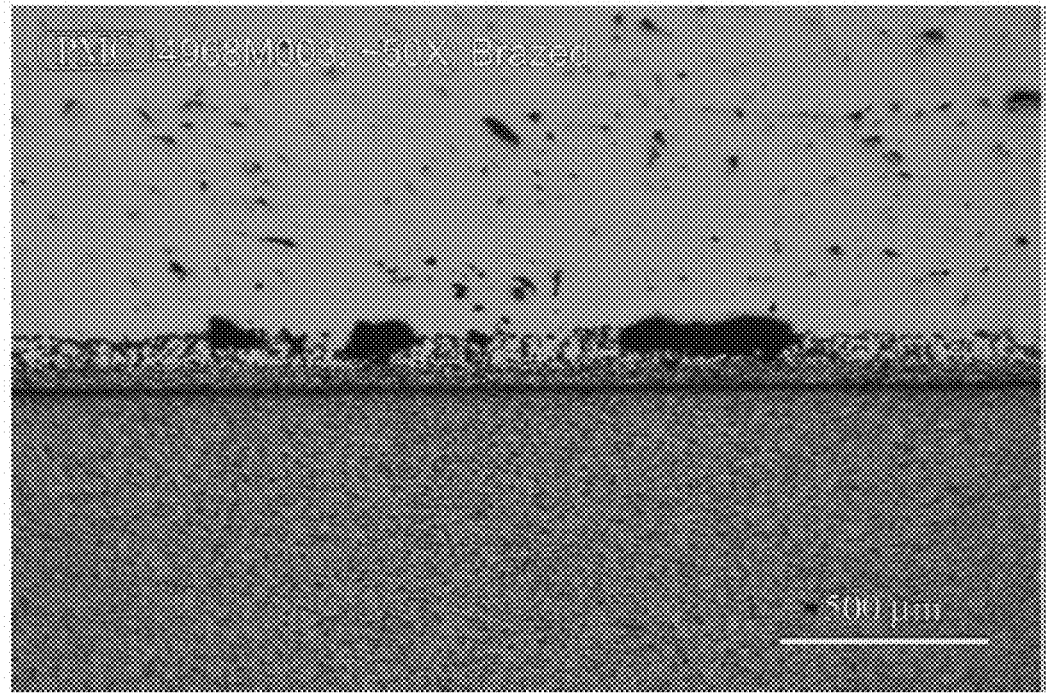
FIG. 1A and FIG. 1B, respectively, are metallography images of a braze joint between Kovar™ and cemented tungsten carbide, using AMS4764, a 52.5Cu 38Mn 9.5Ni braze alloy, as an interlayer, at 50×'s magnification (scale 500 μm), at two different locations along the joint FIGS. 2A and 2B, respectively, are metallography images of a diffusion bonded joint between Kovar™ and cemented tungsten carbide using silver, 99.99% pure, 0.010" thick, as an interlayer, at 200×'s magnification of the joint (scale 125 μm) (FIG. 2A) and 50×'s magnification (scale 125 μm) of the area below the joint (FIG. 2B).

The detailed description set forth below in connection with the appended drawings is intended as a description of various embodiments of the present application and is not intended to represent the only embodiments contemplated. The detailed description includes specific details for the purpose of providing a comprehensive understanding of the present application. However, it will be apparent to those skilled in the art that the present application may be practised without these specific details.

The present application relates generally to a method for bonding a cemented (or sintered) carbide element such as cemented (or sintered) tungsten to a structural component for improved wear resistance of equipment or equipment parts that are typically used in the mining industry such as the oil sands mining industry. Examples of structural components that could benefit from the present method include impact hammers of rotary impact crushers, crusher rolls of roll crushers, crusher teeth, centrifugal slurry pump parts, for example, suction liners and the like, screen cloths for vibrating screens, rotary screens, etc. Generally, structural components are made from carbon steel, low allow steel, stainless steel, or other strong materials such as nickel and cobalt alloys could be candidates as well.

As used herein, "cemented (or sintered) carbides" are metal matrix composites where carbide particles act as the aggregate and a metallic binder serves as the matrix. They consist of fine particles of carbide cemented into a composite by a binder metal. Cemented carbides commonly use tungsten carbide (WC), titanium carbide (TiC), or tantalum carbide (TaC) as the aggregate. Common binders include cobalt, nickel, chromium, iron, molybdenum or combinations thereof.

As used herein, "cemented (or sintered) tungsten carbide" refers to a product comprised of tungsten carbide particles held together by binder comprising cobalt, nickel, chromium, iron, molybdenum or combinations thereof. The various grades of cemented or sintered tungsten carbide depends on the size of the tungsten carbide particles, the percentage of binding phase, and the amount of alloying in the binder phase.

As used herein, "diffusion bonding" is a technique used in metalworking that is capable of joining similar and dissimilar metals. In the present method, diffusion bonding comprises joining an alloy member with a cemented (or sintered) carbide member such as cemented (or sintered) tungsten carbide. Diffusion bonding is conducted in a special equipment in vacuum p<0.5 Pa. The bonding parameters (temperature, applied pressure) correspond to optimum ones limited by the critical creep strain $0.1<\Delta<0.2$ mm of joint section.

As used herein, "brazing" is a metal-joining process in which two or more metal items are joined together by melting and flowing a filler metal into the joint, with the filler metal having a lower melting point than the adjoining metal. The filler metal is brought slightly above its melting (liquidus) temperature while protected by a suitable atmosphere, usually a flux. It then flows over the base metal (in a process known as wetting) and is then cooled to join the work pieces together. A major advantage of brazing is the ability to join the same or different metals with considerable strength. The filler material forms an interface layer or joining interlayer.

As used herein, "interface layer" is the joining interlayer which joins the cemented (or sintered) carbide and a metal alloy such as Kovar™ to form a cladded carbide member. In one embodiment, the interface layer comprises copper, nickel, silver or a nickel and copper alloy.

As used herein "cladded cemented (or sintered) carbide" means at least one surface of the cemented (or sintered) carbide material will be clad with a layer of suitable metallic alloy to enable subsequent friction welding while not causing undesired metallurgical reactions at the metal/tungsten carbide interface. It is understood, however, that more than one surface of the cemented or sintered carbide material could be clad.

As used herein, "friction welding" or "FRW" is a solid-state welding process that generates heat through mechanical friction between work pieces in relative motion to one another, with the addition of a lateral force called "upset" to plastically displace and fuse the materials. Because no melting occurs, friction welding is not a fusion welding process in the traditional sense, but more of a forge welding technique. The combination of fast joining times (on the order of a few seconds), and direct heat input at the weld interface, yields relatively small heat-affected zones. Friction welding techniques are generally melt-free, which mitigates grain growth in engineered materials, such as high-strength heat-treated steels. Another advantage of friction welding is that it allows dissimilar materials to be joined.

As used herein, "linear friction welding" is a type of friction welding where the accelerated component oscillates with linear movements. In linear friction welding, one of the components to be joined is firmly clamped. The other component is accelerated with a linear movement. Then the two parts are pressed together with high pressure. This creates friction heat. The resulting weld flash is optionally trimmed off the end(s). Linear friction welding results in friction over the entire welding area. This means that difficult-to-process materials, such as titanium or nickel-based alloys can be joined easily and quickly. Linear friction welding can join dissimilar metals not considered compatible using conventional welding methods and is able to join a nearly limitless number of shapes and complex part geometries.

In the present method, brazing or diffusion bonding is used to clad at least one surface of a cemented (or sintered carbide) carbide element with a metal alloy to produce at least one surface that can then be welded to a structure made of structural steel and the like by friction welding such as linear friction welding to produce a robust bond with minimal residual stress.

In the following examples, cemented (or sintered) tungsten carbide was used and the metal alloy for cladding was Kovar™. In particular, cemented tungsten carbide tiles were procured from General Carbide™ and are GC-320 with a 20% cobalt content and an average tungsten carbide (WC) particle size of 3 micron. Other useful cemented (or sintered) carbides that could be used in the present method are shown in Table 1 below. It is understood, however, that these cemented (or sintered) carbides are merely exemplary and other carbides not listed in Table 1 could also be used.

TABLE 1

Composition and properties (hardness HRA, transverse rupture strength $R_{TZ}$, adhesive wear resistance L/h) of cemented carbides

| Grade | Carbide content, wt % | Binder composition (wt %) and structure | HRA | $R_{TZ}$, GPa | L/h, m/mm |
|---|---|---|---|---|---|
| H15 | WC 85 | Co(W) | 87.7 | 2.8 | 260 |
| T70/14 | TiC | 14% Ni-austenite steel | 88.2 | 2.3 | 280 |
| T60/8 | TiC 60 | 8% Ni-martensite steel | 88.0 | 2.1 | 300 |

The cladding material used in the following examples was Kovar™ which is a nickel-cobalt ferrous alloy designed to have substantially the same thermal expansion characteristics as borosilicate glass (~$5\times10^{-6}$/K between 30 and 200° C., to ~$10\times10^{-6}$/K at 800° C.). The name "Kovar" is often used as a general term for nickel-cobalt ferrous alloys with these particular thermal expansion properties.

The joining interlayers used in the following examples were: AMS4764, a 52.5Cu 38Mn 9.5Ni as the braze alloy; and Silver, 99.99% pure, 0.010" (0.254 mm) thick and Nickel, 99.98% pure, 0.010" (0.254 mm) thick for diffusion bonding. It is understood, however, that other joining interlayers can be used, as shown in Table 2 below. It is understood that the interlayer may be a thickness in the range of 0.1 mm to 1.0 mm or more.

TABLE 2

Insert (Interlayer) Materials

| Insert/Interlayer | Composition of insert, wt % | Diffusion bonding temperature, ° C. |
|---|---|---|
| monel | 80Ni, 20Cu | diffusion welding, 1150 |
| nickel | 99Ni | diffusion welding, 1150 |
| permalloy | 50NI, 50Fe | diffusion welding, 1150 |
| 1311, amorphous alloy | 16Co, 5Fe, 4Si, 4B, 0.4Cr, rest Ni | diffusion brazing, 1030 |

In the following examples, the maximum strength achievable in diffusion bonding and brazing processes, with the aim of surpassing 37.5 MPa (5439 psi), were determined. The desired outcome of reaching this goal is that the results of these processes will lead to a higher durability and reduce premature joint fractures in service.

EXAMPLES

Materials

Brazed and bonded coupons were made out of approximately 1" thick Kovar™, ground flat and parallel, and 0.75" thick cemented tungsten carbide tiles. Each component has dimensions of 1.5"×2". The cemented tungsten carbide tiles were procured from General Carbide™ and are GC-320 with a 20% cobalt content and an average WC particle size of 3 micron. This type of tile was chosen due to the increased mechanical strength and fracture toughness that comes with an increased binder content and particle size. An increased binder content also results in an increased coefficient of thermal expansion (CTE), which minimizes the risk of a residual CTE mismatch stresses. Additionally, both the cemented WC and the Kovar tiles received separate nickel and silver platings. The brazed parts did not get plated and were prepared by cleaning in an alkaline detergent.

The alloys were cut to size and the parts were assembled with an approximate 0.25" length offset for the shear test. Both the brazed and bonded coupons underwent at least five separate furnace runs.

Testing

The completed brazed and bonded parts were inserted into a compressive shear testing fixture that stopped one end of the part. The part was then loaded into a press that applied a load to the opposite end of the part, putting stress on the joint. The load limit of the testing equipment was 100,000 lbs, until it was recalibrated, at which time the testing limit changed to 60,000 lbs. Metallographic analysis was performed on one of each type of part.

(a) Example 1

The brazed parts were brazed under full vacuum using AMS4764, a 52.5Cu 38Mn 9.5Ni braze alloy as the joining interlayer, which produced a good joint appearance. Four out of the five brazed coupons were sent out for compressive shear testing, and the brazed parts ranged between 25.5 ksi-30.4 ksi, with the final and optimal joint strength at 35.9 ksi. This is 6.6 times greater than the required 5439 psi.

Figure 1B:
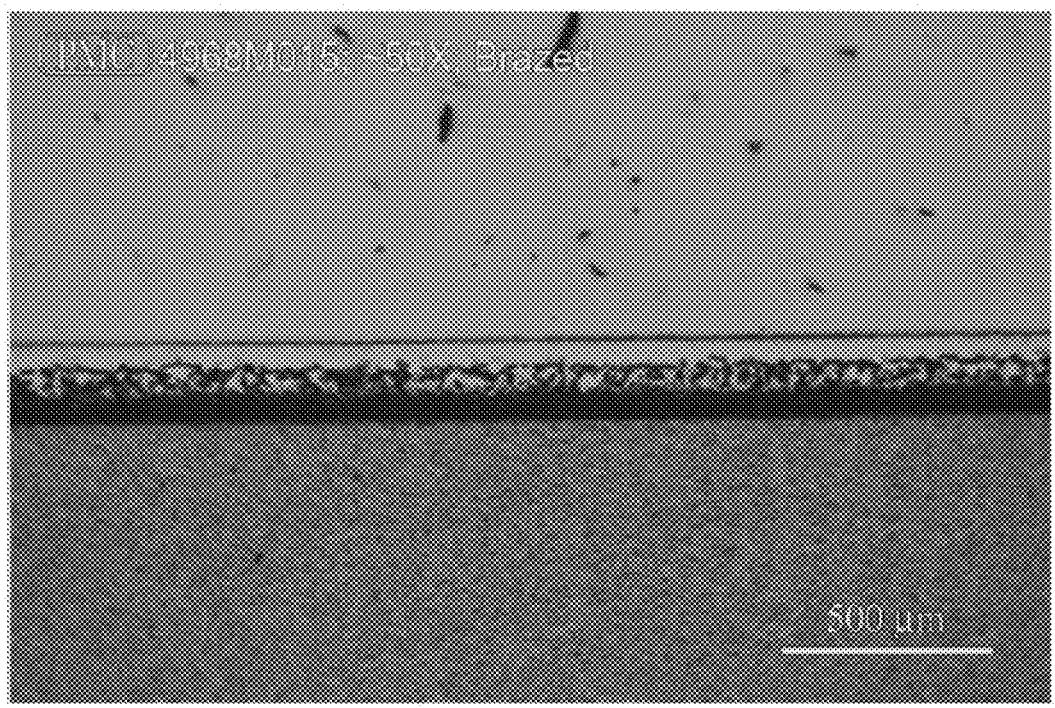

The metallography at 50×'s magnification (scale 500 μm) at two different areas of the brazed joint are shown in FIGS. 1A and 1B. Both areas showed that there were some voids in the joint (located in the middle of each picture), however, not across the entire length. In each picture, FIG. 1A and FIG. 1B, respectively, the Kovar™ is above the joint (located in the middle of each picture) and the cemented tungsten carbide is below the joint. This is not too concerning, as some voids may be expected within a braze joint. The dark line running beneath and across the length of the joint is likely the braze alloy diffusion into the carbide.

(b) Example 2

In this example, the Kovar™ and cemented tungsten carbide coupons were joined by diffusion bonding using silver, 99.99% pure, 0.010" thick, as the joining interlayer. The diffusion bonding process was conducted in a special equipment in vacuum p<0.5 Pa. The bonding parameters (temperature, applied pressure) corresponded to optimum ones limited by the critical creep strain 0.1<Δ<0.2 mm of joint section.

Four out of five silver bonded coupons were shear tested, with the bonding parameters modified until an optimal profile was found. The third part achieved a strength of 11.5 ksi, and the next part was bonded with the same parameters and sent to metallography. The fifth part was further optimized and shear tested. It was loaded upside down in the fixturing by the testing facility and taken to 3000-4000 lbs before the mistake was realized. The alignment was then corrected and the part was retested and debonded at 47,113 lbs, or 19,460 psi. It is not an absolute, however, this implies that the part may have reached an even higher pressure before shearing. The final value is approximately 3.6 times greater than the required value.

Figure 2A:
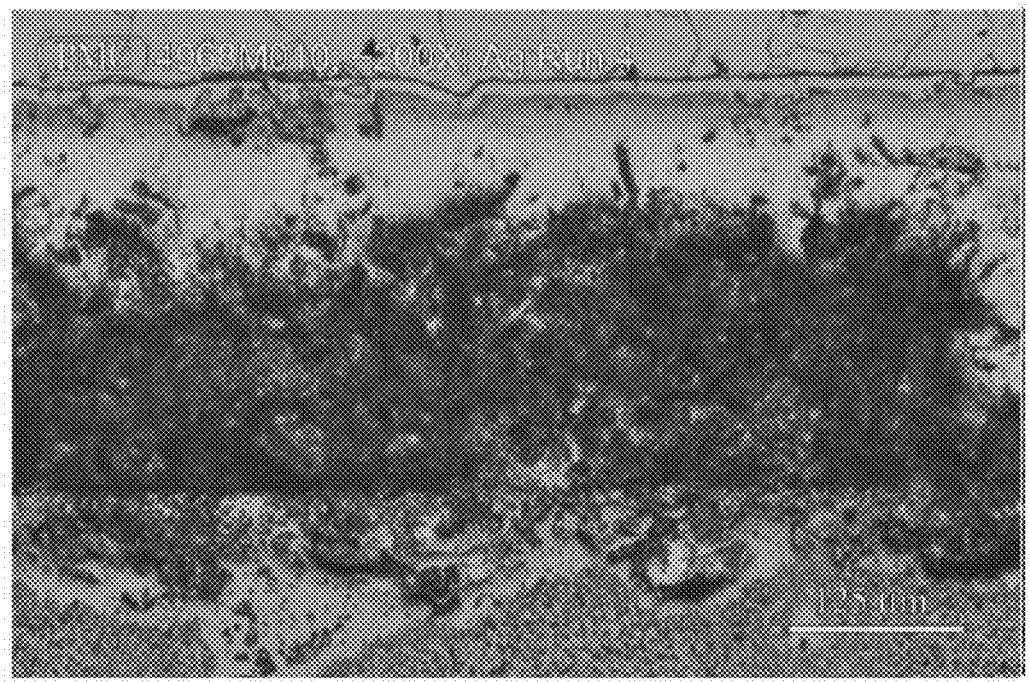
Figure 2B:
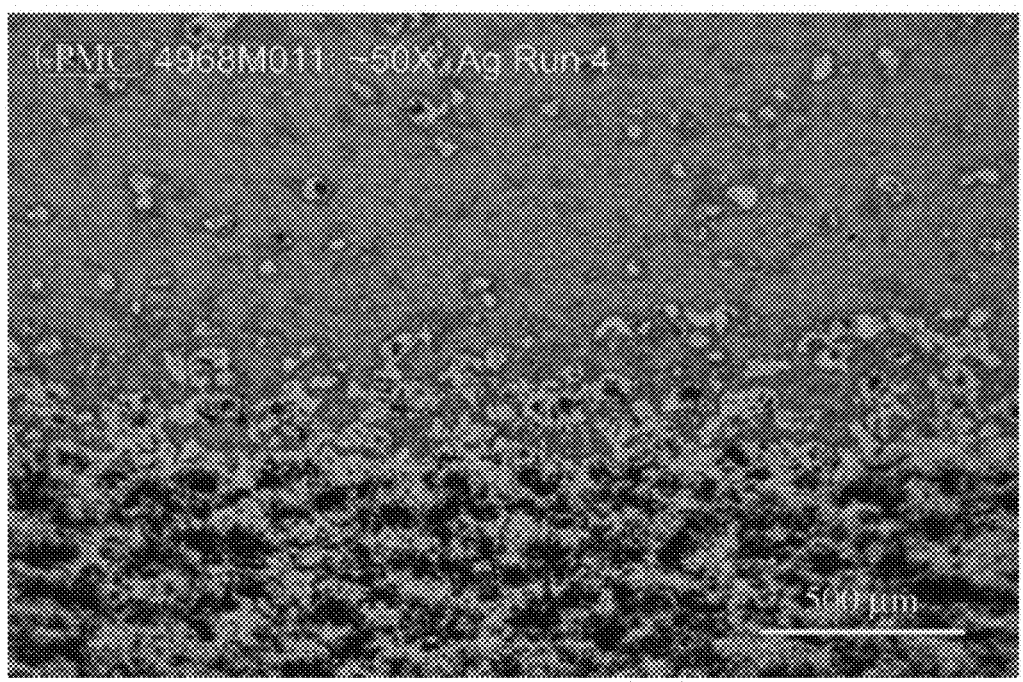

The metallography of the silver bonded coupons are shown in FIGS. 2A and 2B. FIG. 2A is 200×'s magnification (scale 125 μm) and FIG. 2B is 50×'s magnification (scale 500 μm). In each picture, FIG. 2A and FIG. 2B, respectively, the Kovar™ is above the joint and the cemented tungsten carbide is below the joint. The metallography shown in FIG. 2A shows a dark area within the joint, however this is likely a rounded edge creating by the polishing and etching processes. The silver is softer than the surrounding materials, and the etching enhances the differences in the height of the joint. No significant discontinuities were found within the joint. FIG. 2B was taken beneath the area shown in FIG. 2A, and seems to be a different phase in the joint, that extends further into the tungsten carbide. It is unclear what the composition of this area is.

(c) Example 3

In this example, the Kovar™ and cemented tungsten carbide coupons were joined by diffusion bonding using Nickel, 99.98% pure, 0.010" thick, as the joining interlayer. The diffusion bonding process was conducted in a special equipment in vacuum p<0.5 Pa. The bonding parameters (temperature, applied pressure) corresponded to optimum ones limited by the critical creep strain $0.1<\Delta<0.2$ mm of joint section.

As with the silver, four out of five nickel bonded joints were shear tested, and the bonding parameters were again modified for optimization. The third part achieved a shear strength of 15 ksi, and the next part was bonded with the same parameters and sent for metallography. The fifth part was tested and reached 60,012 lbs and did not shear, but the test was stopped, as it was at the maximum force for the testing equipment. This translated to 23 ksi, which is a value 4.2 times greater than the required pressure.

Figure 3A:
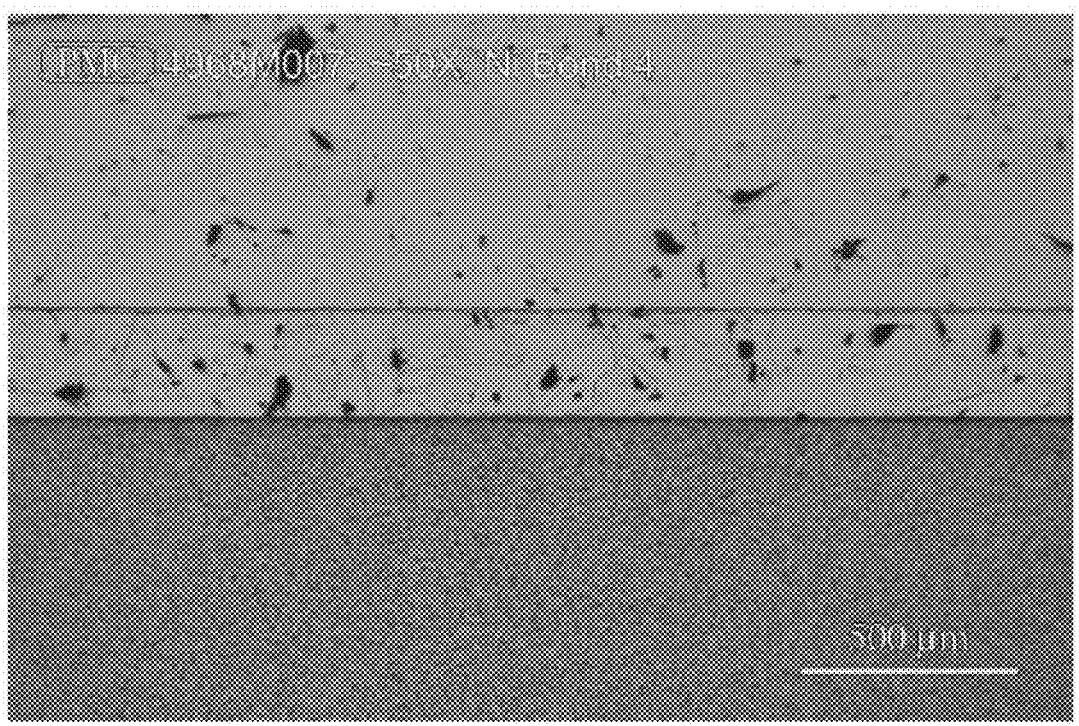
FIGS. 3A and 3B, respectively, are metallography images of a diffusion bonded joint between Kovar™ and cemented tungsten carbide using nickel, 99.98% pure, 0.010" thick, as an interlayer, at 50×'s magnification (scale 125 μm) (FIG. 3A) and 200×'s magnification (scale 125 μm) (FIG. 3B) of the same area.
Figure 3B:
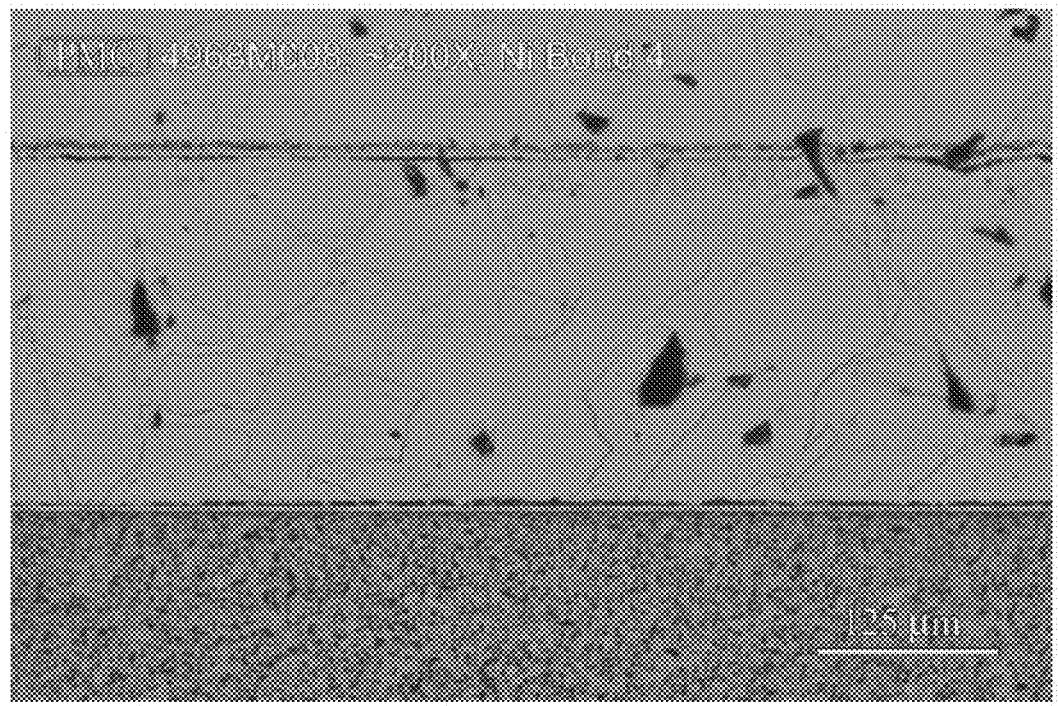

The metallography of the joint of the nickel bonded coupons are shown in FIGS. 3A and 3B. FIG. 3A is 50×'s magnification (scale 500 μm) and FIG. 3B is 200×'s magnification (scale 125 μm). In each picture, FIG. 3A and FIG. 3B, respectively, the Kovar™ is above the joint and the cemented tungsten carbide is below the joint. The metallography of the joint indicates that the objects appearing within the joint are indicative of eutectic solidification. As these do not seem to form a continuous line throughout the joint, they will not likely lead to brittleness or premature cracking. As with the silver bonding, voids were not present within the joint.

The brazing process, silver bonding, and nickel bonding all resulted in shear strength values greater than the required 37.5 MPa (5439 psi). As bonding temperatures increased, the shear strength increased for the silver and nickel bonded parts, achieving strength values 3.5×-4×, respectively, greater than the required value. The brazed parts saw a strength approximately 6.6× higher than the requirement. Metallography showed solid joints without obvious or concerning voids that may lead to brittleness.

(d) Example 4

The suitability of vacuum diffusion bonding to join Kovar™ to tungsten carbide was investigated. An assessment was made for (1) joining tungsten carbide directly to Kovar™, and (2) using a foil of nickel in between the Kovar™ and tungsten carbide. The bonding was conducted at a range of pressures and temperatures that have previously been determined to be appropriate to join the materials. A thin sheet of Kovar™, approximately 0.055 inches thick, and a tungsten carbide tile measuring either 1" width×2" length×0.3" thick or 1" width×4" length×0.3" thick were used in this assessment.

The primary evaluation technique used for the samples prepared was a 'peel test' in which the thin Kovar™ sheet is bent away from the carbide tile. The extent of flexure applied to the Kovar™ is such that removal of the Kovar™ sheet from the carbide is expected. Inadequate behavior in the test is manifested by the failure propagating along the Kovar™/carbide interface without significant deformation of the Kovar™ sheet.

When using technique (1) direct diffusion bonding, the initial Kovar™/carbide bonds came out of the furnace as a bonded piece. The flexure of the Kovar™ sheet at the edge of the carbide resulted in the entire Kovar/carbide bond failing. Examination of the Kovar™ revealed a thin film of carbide material on the sheet. Previous experience with tungsten carbide reacting with iron base materials at high temperature suggests that the Kovar™ material reacted with carbon from the tungsten carbide, forming iron carbides and 'eta' tungsten carbide phases at the interface. Eta tungsten carbide is notorious within the tungsten carbide technical community for inducing brittle behavior, so these results are not unexpected.

Turning now to technique (2), the incorporation of a nickel foil as barrier between the Kovar™ sheet and the tungsten carbide was conducted at reduced bonding temperatures (due to lower diffusion bonding requirements). Samples were produced and were subjected to peel testing. When using a nickel foil in between the Kovar™ sheet and the tungsten carbide, the disbondment of the Kovar™ was localized within the region in which a significant bend was applied to the Kovar™ sheet. Remnant nickel material was observed on both sides of the failed joint, suggesting that the nickel interlayer was the failure path. The localization of failure within the nickel is considered to be a success, as there was no evidence of a brittle phase occurring in the joint that caused the fracture to occur within what otherwise would be a stronger material.

The implications of the successful peel test when using a nickel foil as barrier between the Kovar™ sheet and the tungsten carbide is that the weak point of the material couple, i.e., the Kovar™ and tungsten carbide, isn't at the material transition joint but, rather, within the least strong material, i.e., the nickel foil. This represents as strong a joint as could be formed. The direct diffusion bonding without the nickel foil did not result in as strong a joint as when using a nickel foil.

(e) Example 5

The cladded cemented (or sintered) tungsten carbides of Examples 1-3 are then subjected to the friction welding process to attach the cladded tungsten carbides to a structural element made, for example, from steel. It was decided that welding would begin with a low upset target to minimize the risk of failure. Welding pressures and surface velocity were chosen based on prior steel weld knowledge welding process, in particular, previous friction welding of Kovar™ and steel, which friction welded joints were found to be very robust. Because of the strong bonding of Kovar™ to the tungsten carbides when using diffusion bonding or brazing, as described above, friction welding the Kovar™ cladded surface of the tungsten carbides to steel is not expected to compromise this strong bonding between Kovar™ and the tungsten carbides.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The scope of the claims should not be limited by the preferred embodiments set forth in the examples, but should be given the broadest interpretation consistent with the description as a whole.

The invention claimed is:

1. A method for bonding a cemented (or sintered) carbide element to a structural component, comprising:
    cladding at least one surface of the cemented (or sintered) carbide element with a metal alloy using a diffusion bonding process, and providing an interface layer between the cemented (or sintered) carbide and the metal alloy; and
    friction welding a cladded surface of the cemented (or sintered) carbide element to the structural component.

2. The method of claim 1, wherein the cemented (or sintered) carbide is comprised of tungsten carbide and a binder comprising cobalt, nickel, chromium, iron, molybdenum or combinations thereof.

3. The method of claim 1, wherein the cemented (or sintered) carbide contains tungsten carbide (WC), titanium carbide (TiC), tantalum carbide (TaC) or niobium carbide (NbC).

4. The method of claim 1, wherein the structural component is manufactured as a single unit that is cast or forged from carbon steel, low alloy steel, stainless steel, or nickel or cobalt based alloys.

5. The method of claim 2, wherein the cemented (or sintered) tungsten carbide elements are in the shape of tiles or inserts.

6. The method of claim 1, wherein the cemented (or sintered) carbide elements are clad in a metal alloy including nickel or cobalt alloys.

7. The method of claim 1, wherein the metal alloy is a nickel-cobalt ferrous alloy.

8. The method of claim 7, wherein the metal alloy is comprised of 29% nickel, 17% cobalt and the balance being iron.

9. The method of claim 1, wherein the interface layer comprises copper, nickel, silver or a nickel and copper alloy.

10. The method of claim 1, wherein the structural component is manufactured as a single unit that is cast or forged from carbon steel, low alloy steel, stainless steel, a nickel alloy, or a cobalt alloy.

11. The method as claimed in claim 1, wherein the friction welding is linear friction welding.

12. The method as claimed in claim 1, wherein the cemented carbide is alloyed with a binder selected from the group consisting of nickel, chromium, iron, molybdenum and alloys thereof.

13. A method for bonding a cemented (or sintered) carbide element to a structural component, comprising:
    cladding at least one surface of the cemented (or sintered) carbide element with a metal alloy using a brazing process, and providing an interface layer comprising an alloy comprising copper and nickel between the cemented (or sintered) carbide and the metal alloy; and
    friction welding a cladded surface of the cemented (or sintered) carbide element to the structural component.

14. The method of claim 13, wherein the interface layer is a 52.5Cu, 38Mn, 9.5Ni braze alloy.

* * * * *